United States Patent
Wahlström et al.

(10) Patent No.: US 9,272,239 B2
(45) Date of Patent: *Mar. 1, 2016

(54) TWO-STAGE GAS WASHING METHOD APPLYING SULFIDE PRECIPITATION AND ALKALINE ABSORPTION

(75) Inventors: Jan Wahlström, Porvoo (FI); Juhani Aittamaa, Helsinki (FI); Isto Eilos, Porvoo (FI); Kari I. Keskinen, Helsinki (FI); Jukka Koskinen, Espoo (FI); Marja Tiitta, Porvoo (FI); Heli Vuori, Espoo (FI)

(73) Assignee: NESTE OYJ, Espoo (FI)

( * ) Notice: Subject to any disclaimer, the term of this patent is extended or adjusted under 35 U.S.C. 154(b) by 363 days.

This patent is subject to a terminal disclaimer.

(21) Appl. No.: 13/601,670

(22) Filed: Aug. 31, 2012

(65) Prior Publication Data

US 2013/0053456 A1 Feb. 28, 2013

Related U.S. Application Data

(60) Provisional application No. 61/529,572, filed on Aug. 31, 2011.

(30) Foreign Application Priority Data

Aug. 31, 2011 (EP) .................................. 11179453

(51) Int. Cl.
*B01D 47/00* (2006.01)
*C01B 17/16* (2006.01)
(Continued)

(52) U.S. Cl.
CPC ................ *B01D 53/526* (2013.01); *C10G 2/30* (2013.01); *C10K 1/004* (2013.01); *C10K 1/005* (2013.01);
(Continued)

(58) Field of Classification Search
CPC ........... B01D 53/526; B01D 2257/304; B01D 2257/504; C10K 1/005; C10K 1/008
USPC .......... 518/700, 702, 703; 423/210, 228, 230, 423/239.1
See application file for complete search history.

(56) References Cited

U.S. PATENT DOCUMENTS

| 2,889,197 A | 6/1959 | Baumann |
| 3,435,590 A | 4/1969 | Smith |

(Continued)

FOREIGN PATENT DOCUMENTS

| CN | 101213010 A | 7/2008 |
| DE | 350 591 C | 3/1922 |

(Continued)

OTHER PUBLICATIONS

International Search Report (Form PCT/ISA/210) issued on Apr. 29, 2013, in the corresponding International Application No. PCT/FI2012/050816. (4 pages).

(Continued)

*Primary Examiner* — Jafar Parsa
(74) *Attorney, Agent, or Firm* — Buchanan Ingersoll & Rooney PC

(57) ABSTRACT

Disclosed is a method relating to hydrocarbon production by gasification of carbonaceous material, for example, a two-stage gas washing method as a part of gas refining. Disclosed is a method for hydrogen sulfide and carbon dioxide removal from synthesis gas produced by gasification. Disclosed is a use of a combination of two chemical wash approaches. The process can be utilized as a part of biomass to liquid (BTL) process.

24 Claims, 4 Drawing Sheets

(51) Int. Cl.
| | |
|---|---|
| *C07C 27/00* | (2006.01) |
| *B01D 53/52* | (2006.01) |
| *C10K 1/00* | (2006.01) |
| *C10K 1/08* | (2006.01) |
| *C10K 1/10* | (2006.01) |
| *C10K 1/12* | (2006.01) |
| *C10K 3/00* | (2006.01) |
| *C10K 3/04* | (2006.01) |
| *C10G 2/00* | (2006.01) |

(52) U.S. Cl.
CPC . *C10K 1/08* (2013.01); *C10K 1/105* (2013.01); *C10K 1/106* (2013.01); *C10K 1/108* (2013.01); *C10K 1/12* (2013.01); *C10K 1/122* (2013.01); *C10K 3/006* (2013.01); *C10K 3/04* (2013.01); *B01D 2251/404* (2013.01); *B01D 2257/304* (2013.01); *B01D 2257/504* (2013.01); *C10G 2300/1011* (2013.01); *C10G 2300/1022* (2013.01); *C10G 2300/207* (2013.01); *C10J 2300/0916* (2013.01); *Y02E 50/32* (2013.01)

(56) References Cited

U.S. PATENT DOCUMENTS

| | | | |
|---|---|---|---|
| 3,761,569 | A | 9/1973 | Heiba et al. |
| 4,252,548 | A | 2/1981 | Markbreiter et al. |
| 4,298,584 | A | 11/1981 | Makrides |
| 5,670,123 | A | 9/1997 | Mileo et al. |
| 6,550,751 | B1 | 4/2003 | Brown et al. |
| 8,354,457 | B2 | 1/2013 | Ernst |
| 2004/0036055 | A1 | 2/2004 | Asprion et al. |
| 2005/0109210 | A1 | 5/2005 | Davis et al. |
| 2009/0220406 | A1 | 9/2009 | Rahman |
| 2009/0293722 | A1 | 12/2009 | Svendsen et al. |
| 2010/0163803 | A1 | 7/2010 | Klein |
| 2010/0280137 | A1 | 11/2010 | Kukkonen et al. |
| 2010/0288458 | A1 | 11/2010 | Karlsson et al. |
| 2010/0305220 | A1 | 12/2010 | Kukkonen et al. |
| 2010/0310439 | A1 | 12/2010 | Brok et al. |
| 2010/0317749 | A1 | 12/2010 | Kukkonen et al. |
| 2010/0317903 | A1 | 12/2010 | Knuuttila |
| 2010/0317905 | A1 | 12/2010 | Kukkonen et al. |
| 2011/0009501 | A1 | 1/2011 | Ernst |
| 2012/0131853 | A1 | 5/2012 | Thacker et al. |
| 2012/0202897 | A1 | 8/2012 | Keskinen et al. |
| 2012/0214881 | A1 | 8/2012 | Wahlstrom et al. |

FOREIGN PATENT DOCUMENTS

| | | |
|---|---|---|
| DE | 2 304 497 A1 | 8/1974 |
| EP | 0 986 432 B1 | 1/2005 |
| EP | 2 223 889 A2 | 9/2010 |
| EP | 2 484 427 A2 | 8/2012 |
| GB | 497 255 A | 12/1938 |
| GB | 1 483 038 A | 8/1977 |
| WO | WO 98/55209 A1 | 12/1998 |
| WO | 02/04098 A1 | 1/2002 |
| WO | 2004/072207 A1 | 8/2004 |
| WO | 2007/009943 A1 | 1/2007 |
| WO | WO 2008/113766 A2 | 9/2008 |
| WO | WO 2009/113006 A2 | 9/2009 |
| WO | 2010/060978 A1 | 6/2010 |
| WO | WO 2011/107661 A1 | 9/2011 |

OTHER PUBLICATIONS

Notification of Transmittal of the International Search Report (Forms PCT/ISA/220 and PCT/ISA/210) and the Written Opinion of the International Searching Authority (Form PCT/ISA/237) issued on Apr. 29, 2013, in the corresponding International Application No. PCT/FI2012/050816. (14 pages).

Search Report issued on Dec. 21, 2011, by the European Patent Office for Application No. 11179453.3.

Maat et al., "The Removal of Hydrogen Sulfide from Gas Stream Using an Aqueous Metal Sulfate Absorbent Part I. The Absorption of Hydrogen Sulfide in Metal Sulfate Solutions", Separation and Purification Technology 43 (2005) 183-197.

Maat et al., "Theoretical and Experimental Study of the Absorption Rate of H2S in CuSO4 Solutions, The Effect of Enhancement of Mass Transfer by a Precipitation Reaction", Trans IChemE, Part A, Chemical Engineering Research and Design, 2007, 85(A): 100-108.

The extended European Search Report dated Jul. 27, 2012, issued in European Patent Application No. 11179451.7. (6 pages).

Notification of Transmittal of the International Search Report (Forms PCT/ISA/220 and PCT/ISA/210) and the Written Opinion of the International Searching Authority (Form PCT/ISA/237) dated Aug. 14, 2012, issued in International Application No. PCT/FI2012/050112. (6 pages).

EPA, EPA Air Pollution Control Cost Manual, Sixth Edition, Jan. 2002.

Search Report issued on Jul. 20, 2011 by European Patent Office for Application No. 11153704.9.

Esteban et al., "Exploit the Benefits of Methanol", proceedings of 79th GPA Annual Convention, Atlanta, GA, Processors Association, (2000), 21 pages.

Karl I. Keskinen et al., U.S. Appl. No. 13/369,197, filed Feb. 8, 2012.

Jan Wahlstrom et al., U.S. Appl. No. 13/368,975, filed Feb. 8, 2012.

Translation of Chinese Office Action (Search Report) issued in corresponding Chinese Patent Application No. 201280041886.3 issued Jun. 26, 2015.

TWO-STAGE GAS WASHING METHOD APPLYING SULFIDE PRECIPITATION AND ALKALINE ABSORPTION

RELATED APPLICATIONS

This application claims priority under 35 U.S.C. §119 to European Patent Application No. 11179453.3 filed in Europe on Aug. 31, 2011, the entire content of which is hereby incorporated by reference in its entirety. This application also claims priority under 35 U.S.C. §119 of U.S. Provisional Application No. 61/529,572 filed on Aug. 31, 2011, the entire content of which is hereby incorporated by reference in its entirety.

FIELD

An exemplary aspect is related to the field of hydrocarbon production by gasification of carbonaceous material. Disclosed is a two-stage gas washing method as a part of a syngas refining process. Disclosed is a method for hydrogen sulfide and carbon dioxide removal from synthesis gas produced by gasification. Also disclosed is a use of combinations of wash approaches for an application involving absorption by chemical reactions. An exemplary process can be utilized as a part of a biomass to liquid (BTL) process.

BACKGROUND INFORMATION

The gasification of carbonaceous material can produce primarily carbon monoxide and hydrogen, a mixture referred to as syngas or synthesis gas. Carbon dioxide, water and various hydrocarbons can be abundant side products in the gasification product. Depending on the source and composition of the carbonaceous raw material and gasification conditions, the levels of side products and derivatives present as impurities can vary, influencing refining strategies.

During gasification, the sulfur components originated from biomass can be mainly converted to hydrogen sulfide ($H_2S$) and carbonyl sulfide (COS). In comparison to coal gasification, gasifying biomass raw material can produce very low levels of sulfidic, relatively low levels of nitric and low levels of ash impurities. The level of carbon dioxide can be higher than in coal gasification. These impurity levels can still be harmful for further chemical processing and it can desirable to purify the gas. The decrease of hydrogen sulfide concentration can be desirable for the functioning of the catalysts later in the refining of the syngas. On the other hand, the carbon dioxide's role in further reactions can be as an inert. The reason for removing $CO_2$ can relate to optimizing the streams and decreasing volumes of recycle flows and equipment. The strategies employed from coal gasification may not be readily applicable.

Together carbon dioxide, hydrogen sulfide and carbonyl sulfide can be referred to as acid gas since they dissolve in water forming acids. One means for gas purification is absorption, which can been used for acid gas removal from natural and synthesis gases. When purifying biomass originated synthesis gas, absorption with a liquid solvent can be more efficient than solid absorption. For physical absorption, organic solvents at cold temperatures and high pressure can be common. A better washing effect can be attained, for example, by employing a higher pressure, a colder temperature and a higher purity of the absorbent. For chemical absorption, solutions of arsenic salts, various amines and carbonates can be employed. The absorbent can be regenerated by elevating the temperature and/or releasing the pressure.

An effective absorbent for removing acid gas can be, for example, methanol. Methanol employs low temperatures to be efficient and to reduce or avoid absorbent loss. A commercial process using methanol is an acid gas removal process available under the trade name Rectisol®. The Rectisol acid gas removal process does not require hydrolysis of COS to $H_2S$ and can reduce sulfur component contents to relatively low levels in syngas. Methanol can have a high affinity for hydrocarbons as well as for acid gas. It can also exhibit capabilities to remove not only sulfur components and $CO_2$ but also many relevant trace components (carbonyles, HCN), which can make Rectisol wash a useful process. The syngas can then be reheated to about 350° C. and passed through a fixed bed of sorbent for sulfur components, such as a ZnO guard bed, to further reduce the sulfur component contents in the syngas. Large temperature differences between process phases can consume a large amount of energy and can make processing expensive.

EP 2223889 discloses a device providing further development of the multistage methanol wash as a part of Integrated Gasification Combined Cycle, IGCC. With the device disclosed, as a multistage process, this version of Rectisol process can remove $CO_2$ from the gas. As a process related to power production, desired purity levels, however, can be different from those applied in chemical or fuel production wherein higher purity can be demanded.

U.S. Patent Application Publication No. 2010/0163803 discloses a process for the production of gas products from a raw synthesis gas that is obtained by gasification of carbon and/or heavy oil. Origin of the gas can give it a characteristic component profile. The process description discloses how both the shifted and the unshifted gas streams can be purified of sulfur components and $CO_2$ in sour gas washing, for example, a cryogenic methanol washing. An apparatus suitable for the process is disclosed as well. Sulfur components and $CO_2$ can be removed together, the washes providing no separation of these components.

In addition to physical absorption described above, chemical absorption can be employed. Gas containing large volumes of hydrogen sulfide can be freed from said hydrogen sulfide by first conducting the gas stream into aqueous solutions containing copper ions in water for absorbing the hydrogen sulfide and then oxidizing the copper sulfide thus formed with air or oxygen gas to produce elemental sulfur. DE 2304497 discloses an aqueous absorption medium which can contain high concentrations of copper ions (for example, 28.9 g Cu in 1400 ml water), and absorption of the hydrogen sulfide carried out by bubbling the gas into the aqueous medium.

EP 0 986 432 B1 discloses a method for selective hydrogen sulfide removal from gases comprising both $H_2S$ and $CO_2$. When these components were present in the gas in $CO_2$ to $H_2S$ ratio of 2:1, the method removed 99% of the $H_2S$ selectively. However, when said ratio was 200:1, the $H_2S$ removal was 95%.

U.S. Pat. No. 2,889,197 discloses a two-step gas washing method including two alkaline washes. Both washes are performed with alkali, ammonium is mentioned, and an inorganic salt. Disclosed is the recovery of the sulfur component from the wash solution as a sulfate suitable for use as a fertilizer. Column 3, lines 30-31, indicates that after these two alkaline washes, an acidic washing is employed. The document discloses no experimental proof on the effectiveness or results obtainable by said method.

It can be desirable to provide a method for removal of sulfur components and carbon dioxide from syngas obtainable by gasification of carbonaceous material, for example, when gasifying biomass. It can be desirable to remove sulfur components and carbon dioxide from the syngas in an energy efficient way. It can be desirable to effectively combine sulfur component and carbon dioxide removal. It can be desirable to provide simplification, increase of the effectiveness and identification of possibilities for synergism of the overall BTL process.

SUMMARY

According to an exemplary aspect, a method for washing hydrogen sulfide and carbon dioxide from a gas obtainable by gasification of a carbonaceous biomass is provided, the method comprising: a) contacting the gas with a first absorbent solution comprising transition metal ions in acidic aqueous solution, wherein the transition metal ions include copper, zinc, iron, cobalt or a mixture thereof; b) binding hydrogen sulfide present in the gas to said first absorbent solution; c) recovering the gas from step b); d) contacting the recovered gas from step c) with a second absorbent solution comprising an alkaline absorbent; e) binding carbon dioxide present in the recovered gas from step c) to said second absorbent solution; and f) recovering the gas obtained from step e).

According to an exemplary aspect, a method for producing hydrocarbons or derivatives thereof from a biomass raw material is provided, the method comprising: i) gasifying the biomass raw material in the presence of oxygen to produce a gas comprising carbon monoxide, carbon dioxide, hydrogen, water and hydrocarbons; ii) optionally conducting a tar reforming step; iii) optionally removing tar components from the gas; iv) optionally adjusting a hydrogen-to-carbon monoxide ratio; v) conducting the method according to claim 1; vi) converting in a synthesis reactor at least a part of the carbon monoxide and hydrogen contained in the gas into a product including a hydrocarbon composition or derivatives thereof; and vii) recovering the hydrocarbon composition or derivatives thereof.

DETAILED DESCRIPTION

Figure 1:
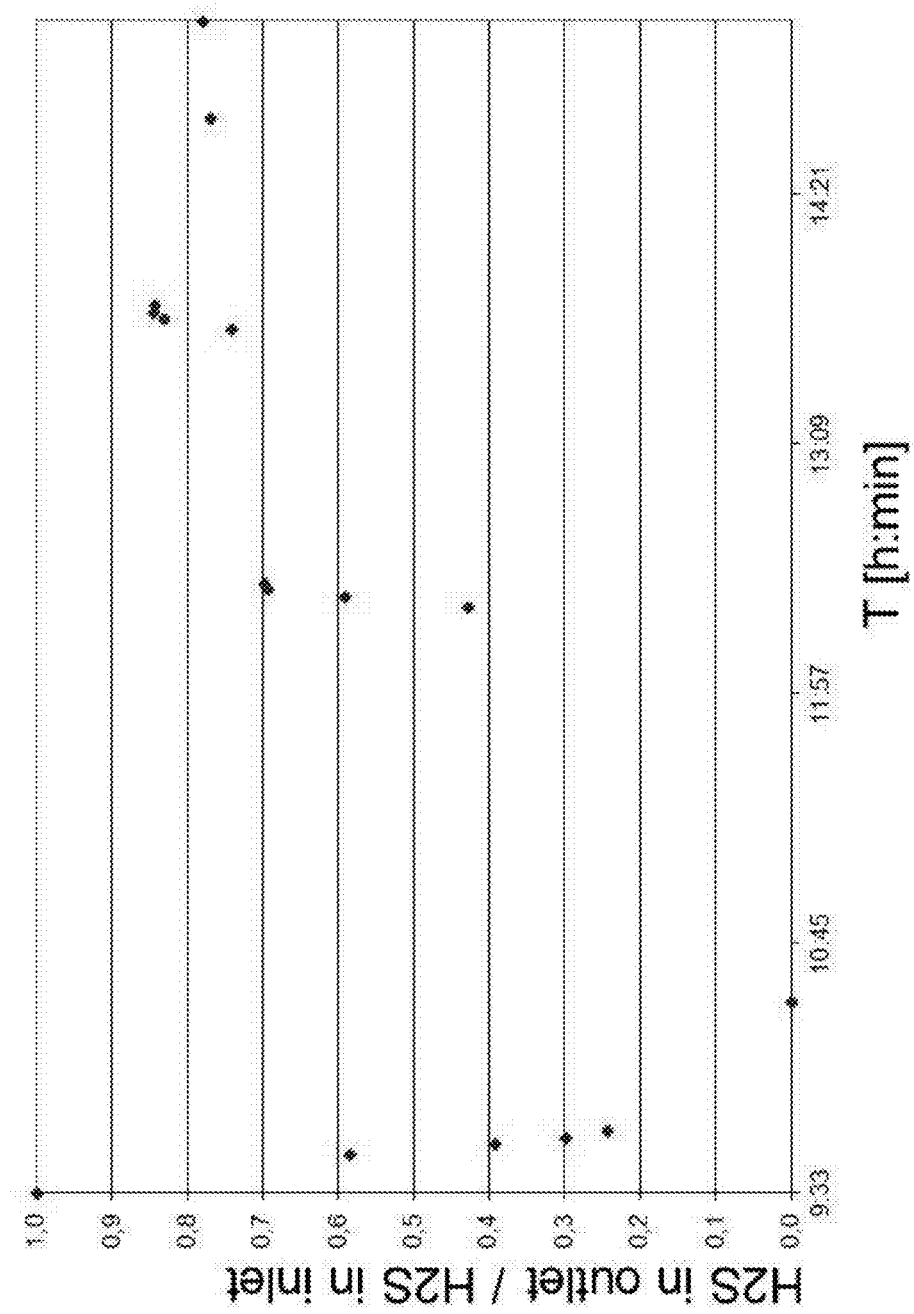
FIG. 1 is a graph showing a ratio of $H_2S$ mole flow in the wash bottle outlet/$H_2S$ mole flow in the wash bottle inlet as a function of time [h:min], according to an exemplary aspect. Such data is of the experiment of Example 1 including contacting the gas with a first absorbent solution, here aqueous $CuSO_4$ solution, binding sulfur components from gas thereto and recovery of gas according to steps a, b and c of an exemplary process. The experiment was started at 9:33 and the last point was measured at 15:11.

Disclosed is an exemplary washing method comprising two different chemical absorption steps which can provide high purity product with lower energy consumption than comparative methods. As an exemplary aspect, a method for washing hydrogen sulfide and carbon dioxide from a gas obtainable by gasification of carbonaceous biomass is provided, comprising:

a) contacting said gas with a first absorbent solution comprising transition metal ions, said transition metals selected from copper, zinc, iron and cobalt and mixtures thereof, in acidic aqueous solution;

b) binding sulfide ions to said first absorbent solution;

c) recovering the gas from step b);

d) contacting recovered gas from step c) with a second absorbent solution comprising an alkaline absorbent;

e) binding carbon dioxide to said second absorbent solution;

f) recovering the washed gas from step e).

An exemplary method and embodiments thereof can provide advantages. An exemplary advantage provided by an exemplary method is related to process design. For example, when applying two chemical absorption steps, any need for thermal conditioning and heat exchange equipment, for example, for cooling, can be significantly reduced compared to processes using physical absorption, for example, methanol washes. The energy consumption can be smaller. The two-step washing arrangement can be desirable because of high levels of both $H_2S$ and $CO_2$. The $H_2S$ removal in the first absorption step can affect the second absorption by moderating any desired levels for absorption conditions. As an exemplary method can be suitable for washing biomass derived syngas, the wash combination, for example, at given sequence can provide efficient treatment for gas having high $CO_2$ and $H_2S$ mole concentrations. An exemplary method can produce washed gas having a $H_2S$ level of less than 20 ppb, for example, even lower levels, for example, less than 1 ppb.

According to an exemplary aspect, when used as a part of a biomass to liquid process, the washing method can be applied among the other process steps providing an improved method for producing hydrocarbons or derivatives thereof. The method can comprise the steps of:

i) gasifying the biomass raw material in the presence of oxygen and/or steam to produce a gas comprising carbon monoxide, carbon dioxide, hydrogen, water and hydrocarbons;

ii) optionally a tar reforming step optionally removing tar components, for example, naphthalene from the gas;

iii) optionally adjusting the hydrogen to carbon monoxide ratio;

iv) washing, for example, as described herein;

v) converting in a synthesis reactor at least a significant part of the carbon monoxide and hydrogen contained in the gas into a product including hydrocarbon composition or derivatives thereof; and vi) recovering the hydrocarbon composition or derivatives thereof.

In an exemplary embodiment, when the synthesis of step vi is Fischer-Tropsch (FT) synthesis, the wash protocol of step v can reduce the levels of acid gases in the feed of FT synthesis process to levels as low as 20 ppb, for example, which can meet desirable levels for FT catalysts, and the level of $CO_2$ can be low enough to prevent accumulation thereof in the process.

Disclosed is a method for washing of hydrogen sulfide ($H_2S$) and carbon dioxide ($CO_2$) from a gas obtainable by gasification of carbonaceous biomass. The method can involve two consequent washes, both based on chemical absorption but involving different reactants and reaction strategies. The first wash can comprise contacting said gas with a first absorbent solution comprising transition metal ions, said transition metals selected from copper, zinc, iron and cobalt and mixtures thereof, in acidic aqueous solution; binding sulfide ions to said first absorbent solution; recovering the gas from step b.

The first wash can remove selectively hydrogen sulfide from the gas. The removal efficiency can be high. For example, at least 90%, for example, at least 95% of the hydrogen sulfide present in the feed can be removed in this step.

The second wash can comprise contacting recovered gas from step c with a second absorbent solution comprising an alkaline absorbent; binding carbon dioxide to said second absorbent solution; recovering the washed gas from step e.

The second wash can remove, for example, principally remove, carbon dioxide. As the concentration of sulfide ions can be already considerably diminished in the first wash step, the absorbing capacity of the second absorbent, for example, the alkaline absorbent can be utilized mainly for the carbon dioxide removal. The inventors have found that the hydrogen sulfide concentration can be further lowered in the second wash providing recovered gas of such a high purity, that in an exemplary embodiment guard beds removing $H_2S$ prior to synthesis reactions can be omitted.

When applying an exemplary method, the selection of the conditions for the second wash can be less stringent than when applying corresponding alkaline absorbent detached. For example, the second absorbent solution can be applied as an aqueous amine wash, carbonate wash, carbonate precipitation or a combination thereof. For example, the temperature, pressure, recycling, etc., need not be pushed to extremes to obtain desired purity levels. For example, the temperature with which high purity was acquired experimentally can be noted.

An exemplary benefit is that when applying sequential removal of $H_2S$ first and $CO_2$ after that, these unit processes can be substantially independent from each other. For example, the second wash step can be steered to a desirable purity level in view of further processing without compromising the exemplary ultraclean character of the first absorption step. Thus, independent control of the removal of acid gases can be possible through an exemplary method.

As used herein, "absorbent solution" can include a wash liquid used for washing the gas. For processing purposes, as fresh, it can be a true solution in which all components are dissolved in the solvent, such as an aqueous solution. The absorbent solution can contain solids or precipitates when used, for example, when there has been a chemical reaction involved.

"Binding a gas (hydrogen sulfide or carbon dioxide) to an absorbent solution" can include absorption of said gas to said solution. It can include all phases of absorption, material transfer from gas to gas-solvent interface, shift from gas to liquid phase, and in the case of a chemical absorbent the chemical reaction in question.

An exemplary two-stage method can remove, for example, at least 99%, for example, at least 99.9% of the $H_2S$ present in the feed gas. Of the carbon dioxide, the removal can be at least 90%, for example, at least 95% of the $CO_2$ present in the feed gas.

When describing the process, measurements, and results, the proportions given are percentages of the total gas volume of the dry gas unless otherwise stated.

Figure 4:
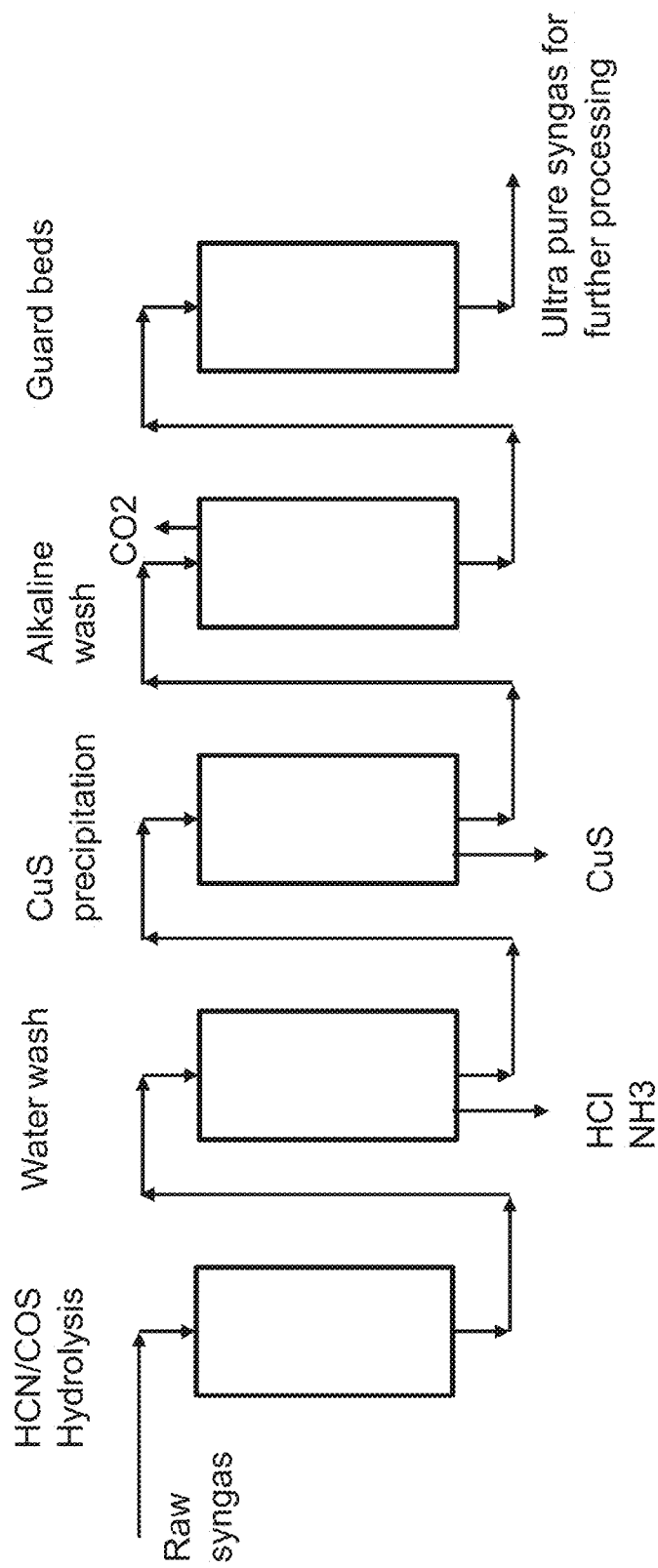
FIG. 4 is a flow diagram of an exemplary embodiment of a method for $H_2S$ and $CO_2$ removal by a two-stage process.

An exemplary method is shown in FIG. 4, which shows a simple flow diagram of an exemplary method for $H_2S$ and $CO_2$ removal by a two-stage process. In FIG. 4, raw syngas can be fed to an optional hydrolysis reactor, which can convert HCN and COS, followed by an optional water wash reactor, from the outlet of which aqueous HCl and $NH_3$ can be removed. An exemplary aspect of the method lies within the next two reactors. The first of the reactors can be a reactor named in the FIG. 4 as a CuS precipitation unit. In said reactor, the gas can be contacted with dilute aqueous $CuSO_4$ solution. With sulfides originating from gaseous hydrogen sulfide, copper can form CuS, which can be practically insoluble in water and can precipitate out of the solution.

Gas thus recovered can be next led to an alkaline absorption unit to remove $CO_2$. Aqueous alkaline absorbents can have good capacity to remove acid gases, but as a major part of gaseous hydrogen sulfide can be already removed in the preceding step, the unit can be designed for $CO_2$ removal only or primarily.

In the exemplary embodiment described in FIG. 4, for example, the gas can be fed to the absorber from a gas scrubber. The first absorption step in acidic aqueous solution can be performed at the same temperature as said scrubbing, as well as the second wash with alkaline absorbent solution.

Optionally a guard bed (FIG. 4) or multiple guard beds can be added downstream of the units, for safety and in case of abnormal situations.

The combination of first and second absorbents according to an exemplary aspect can allow separate recovery of $CO_2$ and $H_2S$ providing savings in energy consumption in comparison to, for example, a one step methanol wash when removing both $H_2S$ and $CO_2$. When judged against methanol wash employing cold conditions (for example, temperatures below 0° C.), an exemplary method can provide substantial benefit with regard to operating temperature and energy consumption and cooling equipment thereof.

Feed Characteristics

When refining syngas obtainable from gasification of biomass the acid gases can mainly include $H_2S$, $CO_2$ and COS. As an example of a composition, the gas composition fed to acid gas wash can comprise as main components (calculated of the dry gas) from 20 to 40 vol-% $H_2$, from 10 to 30 vol-% of CO, and as acid gas impurities from 50 to 400 ppm $H_2S$, from 20 to 40 vol-% $CO_2$ and 5 to 50 ppm COS and other traces.

Special characteristics for refining gas originated from biomass can be the high $CO_2$ and $H_2S$ concentrations. If there is a desire to recover these components separately, comparative methods can employ physical absorption, as chemical absorbents can tend to remove $CO_2$ and $H_2S$ simultaneously.

Transition Metal Ions

In an exemplary method for washing hydrogen sulfide and carbon dioxide from a gas obtainable by gasification of carbonaceous biomass, the first step of this method can comprise first contacting said gas with a first absorbent solution comprising transition metal ions in acidic aqueous solution.

This step can be efficient for $H_2S$ removal. For example, in acidic aqueous solutions, transition metal ions, for example $Cu^{2+}$ ions, can react fast with $H_2S$ in liquid at even very small metal ion concentrations. The results were evidenced in, for example, patent application EP 11153704 disclosing a method of purifying gasification gas (syngas) by absorbing impurities of syngas in a liquid absorption medium containing metal ions capable of binding sulfide ions into solid sulfides which have low solubility in water and aqueous solutions. Thus, said metal ions, for example, predominantly bivalent transition metal ions, can have the effect of binding sulfides, present as $H_2S$ in the gas phase, from gas to said first absorbent solution. When reacted with this solution, the gas can be recovered for further processing.

Another document, EP 0 986 432 B1, discusses an exemplary theory, for example, the precipitation characteristics from paragraph 27 to paragraph 43.

The inventors have further developed a concept and have shown that when transition metal ion absorption for $H_2S$ removal, as the first wash, is combined with an alkaline absorption for $CO_2$ removal, said absorptions together can provide unexpected synergism.

For example, this first step can be carried out by contacting the gas with the first absorbent solution, thus an acidic aqueous wash solution containing transition metal ions capable of binding to sulfide ions of the sulfide compounds present in the gas. The concentration of the transition metal cations can be small, for example, the aqueous solution can have a concentration in respect of the transition metal ions of about 0.00001 to 0.01 M. A significant portion of the sulfide impurities present and contained in the gas can be converted into transition metal sulfides. The sulfides thus formed can be precipitated from the wash solution whereby the sulfide impurities are removed from the gas. The purified gas so obtained can be recovered from the aqueous solution.

The metal ions, for example, cations, of the wash solution can be derived from transition metals selected from copper, zinc, iron and cobalt and mixtures thereof. For example, the wash solution can comprise bivalent metal cations ($Me^{2+}$) of copper ($Cu^{2+}$), zinc ($Zn^{2+}$) or iron ($Fe^{2+}$) or mixtures thereof, because these cations can react with sulfides ($S^{2-}$) forming salts with very low solubility in water. For example, suitable salts used as metal cation sources can comprise traces of other metal derivatives as well. For example, commercial $CuSO_4$ salt can comprise some monovalent copper, as $Cu_2SO_4$. Copper can be cost efficient and can be successful in experimental studies, for example, when added as $CuSO_4$.

The transition metal ions can be obtained from water soluble metal salts by dissolving said salts in water. In an exemplary embodiment, the aqueous solution can be prepared by dissolving about 1 to 10,000 parts, for example, about 50 to 5000 parts by weight of a metal salt into 1,000,000 parts by weight of water ($ppm_w$).

When applied to $H_2S$ removal from syngas obtainable from biomass gasification, the concentration of the metal ion compound of the wash solution can be lower than about 1000 $ppm_w$, for example, lower than 100 $ppm_w$, calculated from the weight of the absorption liquid. This can allow for very effective and profitable integrated process concept for removal of $H_2S$ and other impurities mentioned above from syngas.

The concentration of $Me^{2+}$ ions in the aqueous wash solution can be about 0.00005 M to 0.005 M per liter, for example, about 0.0001 to 0.001 M.

The aqueous wash solution can be acidic or weakly acidic. For example, it can have a pH of about 1 to 6.5, for example, about 1 to 5. The pH can vary within the indicated range depending on the selection of the metal cations. For example, in an embodiment in which metal cation source is $CuSO_4$, the aqueous solution can have a pH of at least about 3, for example, a pH from 4 to 5.

The gas can be contacted with the wash solution at a temperature from 10 to 80° C. and at a pressure from 1 to 50 bar (absolute pressure). For example, the washing can be carried out at ambient temperature and pressure (20 to 25° C. and 1 bar(a)). It is also possible, for example, to employ the present technology at lower temperatures (10 to <20° C.) and at elevated temperatures (>25 to 80° C.). The pressure can be in excess of 1 bar(a), for example about 1.5 to 50 bar(a). As both the first absorption step and second absorption step can be based on chemical absorption, any need or desire for cooling and thus energy consumption is not as high as it would be for physical absorption.

For example, the syngas obtained from gasification can be recovered at a higher temperature than indicated in the preceding. Therefore, in an exemplary embodiment, the gasification gas can be cooled to a temperature within the above indicated range (for example, from 10 to 80° C.) before being contacted with the washing liquid. When the temperature is higher than 80° C. the reaction can be fast, but the precipitate can be formed as very fine particles which can be difficult to recover from the wash liquid. If the temperature is below 10° C., any need or desire for cooling can raise the operating costs. It can be possible to recover some of the heat contained in the gasification gas by contacting it with a cooling media, for example, with cooling water, in a heat exchanger.

Under these conditions, acidic compounds, such as hydrogen chloride, may be absorbed. The aqueous, metal ions containing solution can be applied in acidic form. For example, it can be capable of absorbing further impurities, such as ammonia ($NH_3$) and hydrogen chloride (HCl) as well as other alkaline and acidic impurities. This can be beneficial for the overall process.

The molar ratio of metal cations to sulfide compounds of the gas to be purified (i.e., $Me^{2+}/S^{2-}$ ratio of the feed) can be in excess of 1, for example, from about 1.4 to about 6. The use of metal ions can be efficient and no great excess is needed, because the reaction can proceed nearly irreversibly as precipitated MeS exits the solution.

Process Equipment

Said contacting gas with a first absorbent solution comprising transition metal ions in acidic aqueous solution may be implemented in tray or packed column and/or applied by spraying or atomizing. In an exemplary embodiment, the contacting of the syngas with the absorption medium can take place by spraying or atomizing the absorption medium into the gas. For example, the contacting of the syngas with the absorption medium can take place in the interface between the gas and droplets of the absorption medium. In an exemplary embodiment, the gas to be purified can be bubbled into a stirred tank containing the absorption solution. In an exemplary embodiment, absorption towers with plates and/or packing can be used in a counter-current operation. The detailed equipment type can depend on the concentration of the metal ions in the solution and the amount and impurity content of the gas. An exemplary way of performing the chemical absorption process is to use chemical spray absorption concept combined with sieve tray(s) above the spray chamber section(s) as described and shown in FIG. 6 of EP Application 11153704.

In an exemplary embodiment based on the spray chamber approach, the wash solution can be contacted with the gas in a spray chamber having a substantially vertical central axis, said gas being fed into the spray chamber from the bottom or from the top and withdrawn from the opposite end so as to advance in the direction of the central axis of the spray chamber. The wash solution can be fed through spray nozzles arranged in at least two spray zones arranged in series along the central axis at different heights in the spray chamber. The gas can be fed into a spray chamber, for example of the preceding type, via gas distributors arranged below the lowest spray zone, and the metal sulfide can be withdrawn from the absorber along with the used wash liquid via an outlet arranged in the bottom part of the chamber.

In an exemplary embodiment, wherein regeneration is applied, after the absorption of the sulfides, MeS-crystals and other solids can be separated from circulated aqueous wash liquid.

A transition metal ion washing unit can also include two aqueous $Me^{2+}$ wash sections (following the direction of the gas flow), wherein the first section can be operated with an aqueous wash dilute with $Me^{2+}$-ions and the second section with another aqueous wash rather highly concentrated with $Me^{2+}$-ions. The desired amount of $Me^{2+}$-ions can be fed in the form of an aqueous $Me^{2+}$-solution into the second wash section and circulated. Synthesis gas from the first wash section can be fed into the second wash section where almost all of $H_2S$ in synthesis gas can be removed by counter-current wash.

The purification results using transition metal ions in acidic aqueous washing liquids can be very good. An exemplary method can be capable of removing a significant portion of the hydrogen sulfide from the gas. For example, at least 98% by volume, for example, at least 99.5%, of the hydrogen sulfide can be removed from the gas. As a result, in an exemplary embodiment, the concentration of hydrogen sulfide of the gas after the first wash step can be less than about 100 ppb by volume, for example, less than about 50 ppb by volume. This can be further diminished by the second wash step removing mainly carbon dioxide, but reducing the hydrogen sulfide content to less than 20 ppb, for example, less than 10 ppb or even less than 1 ppb.

The gas purified in the first absorption can provide the feed for a second absorbent solution comprising an alkaline absorbent selected from amines, carbonates and combinations thereof.

Alkaline Absorption

In alkaline washes using aqueous solutions of amine and/or alkaline metal ion compound in the field of acid gas purification, the reactions between the acid gases, $H_2S$ and $CO_2$ can compete against each other for the alkaline reagent. Introducing alkaline absorption subsequently to the aqueous transition metal wash, which has already removed $H_2S$, can provide unexpected advantages for $CO_2$ removal. In said alkaline absorption, alkaline absorbent can be selected from amines, carbonates, aqueous CaO solution and combinations thereof.

Alkaline absorptions can be performed using aqueous solutions comprising an amine or a carbonate or comprising amines, carbonates or mixtures thereof. Said washing solutions, absorbent solutions or washing liquids, for example, after use, can comprise impurities bound thereto, at least as trace amounts after the optional regeneration.

For example, said alkaline absorption, hence the contacting of gas obtained after first wash with a second absorbent solution, can take place at a temperature from 10 to 80° C., for example, from 20 to 40° C. for amine washes. This can provide a benefit that the process conditions need not to be altered between two chemical absorption steps of an exemplary method. Another exemplary option is that the temperature of the second wash stage can be selected to be compatible with the process step following thereafter.

Amine Wash

The reaction of amine with $H_2S$ can be very fast. The rate determining factor in this reaction can be the transition of $H_2S$ to gas/liquid surface. The reaction of amines with $CO_2$ can be slow and can be the limiting factor in $CO_2$ absorption. The reactions between amines and COS, $CS_2$ and $CO_2$ can consume amines whereby regular purification of the absorbent solution and adding of fresh amine solution can be desirable.

Amines can be classified as primary, secondary and tertiary amines depending on the status of the nitrogen atom of the amine, i.e., how many carbon atoms are bonded to the amine nitrogen. In the context of acid gas absorption, the primary amines can show the highest reactivity.

Primary and secondary amines can show no specificity towards $H_2S$ or $CO_2$. Therefore selective removal may not be feasible using a primary or secondary amine only. Tertiary amines can be suitable for selective $H_2S$ or $CO_2$ removal, as they can exhibit faster reaction rates towards $H_2S$ than $CO_2$. The selectivity can be provided by the first absorption phase, the transition metal wash, and the selectivity of second wash is not crucial. Therefore, any restrictions which can limit comparative amine washes can be of minor relevance in an exemplary method. Selection of a suitable amine can be more relaxed and can be made based on criteria other than selectivity.

The amines can include alkanolamines. Commercially available are, for example, monoethanolamine (MEA), diethanolamine (DEA), methyldiethanolamine (MDEA). Some chemical providers market reagents 2-(methylaminoethanol), 2-aminohexan-1-ol, diisopropanolamine, 2-(2-aminoethoxy)ethanol, methylamine, dimethylamine (DMA) and trimethyamine (TMA) for amine washes. These reactants can be applied together with additives, for example, selected from hydrocarbons substituted with nitrogen, such as piperazine. The additive content can be quite high, but, for example, not exceeding 20 mol-% of the amine content. One exemplary effect obtained by the use of additives is the decrease of any need for recycling.

The amount of the amine in aqueous absorbent solution can be from 5 to 30 wt-%, for example, from 5 to 55 wt-%, for example, from 20 to 40 wt-% the remainder being mainly water. Too low an amine content can lower the absorption efficiency, whereas too high can increase the corrosion of the process equipment. The amine content can also be adjusted to serve the purpose, thus provide the desired $CO_2$ level.

Carbonate Wash

The absorbent solution for alkaline metal ion containing wash can be formed by dissolving metal ion containing compound in water. In an exemplary embodiment, the cation does not form precipitates in the conditions of the wash, but reacts with the acid gases. For example, commercial processes using hot potassium carbonate ($K_2CO_3$) are called Catacarb and Benfield. The process may further comprise a catalyst or an additive. The additive can increase removal efficiency for $H_2S$, $CO_2$ and COS, and can be selected from amines. An exemplary process temperature in carbonate wash can be higher than for amine washes, for example, from 70 to 120° C., or even up to 200° C. in some embodiments, because the increase in temperature can increase the absorption respectively. An exemplary process pressure is from 10 to 125 bar.

Carbonate Precipitation

For the $CO_2$ removal, another exemplary method is precipitation with calcium ions. An aqueous alkaline absorbent can comprise CaO. According to this embodiment, CaO powder can be mixed and at least partially dissolved in water. $Ca(OH)_2$-water solution can be fed into mixed reactor or spray unit for spraying according to routine practice. The pH of this solution can be kept alkaline.

In mixed reactor the gas can be introduced into the reactor through a sparger and dispersed into small gas bubbles reacting with $Ca(OH)_2$. $CO_2$ can be precipitated with calcium ions forming solid $CaCO_3$. Precipitate can be removed from the solution and washed gas recovered for further refining.

As an additional benefit in the precipitation process, the alkaline solution can also contribute to simultaneous capture of chlorine impurities from the synthesis gas. If the aqueous $Ca(OH)_2$ solution is recycled, it can be led through an ion exchange resin bed where S- and Cl-ions can be removed from the solution in a suitable manner.

Energy Consumption

An exemplary method comprises two chemical absorption steps. In absorption processes, there can be three stages determining the energy consumption level. For example, parameters contributing to low energy consumption can be selected.

The first one can be the conditioning of the gas (preheating or precooling of the gas) to be washed before feeding to the absorption stage. For chemical absorption, the applicable temperature range can be much broader and any desire for thermal conditioning at this stage can be lower than for physical absorption. In many cases, no conditioning is needed, as the chemical wash can be performed at the temperature of the preceding process step.

As the combination of the exemplary two chemical absorption methods is concerned, it can be beneficial when low temperature waste heat is available, for example, from adjacent or related processes or process steps. The energy retrievable from such sources can be adequate to provide a temperature suitable for these chemical absorption reactions. The energy can be even cost-free.

According to an exemplary embodiment, both chemical absorption steps can be selected to take place under the same or different conditions. For example, both chemical absorption steps can take place at the same temperature or at the same pressure or both. In other words, for example, contacting of the gas with the second absorbent solution can take place at substantially the same temperature and/or same pressure as said contacting of the gas with the first absorbent solution. For example, both of these conditions, temperature and pressure, can be substantially the same. This can provide advantages for the process design and/or for the operation costs, as units for heat exchange or pressurizing are not needed in-between first and second absorption units.

The next energy intensive phase can include the absorption stages. Therein, depending on the reagents, conditions and level of purity selected, it can be desirable to cool or heat the reactor and/or reagents.

The third point where energy consumption can be considered is the regeneration of the absorbent. In case of chemical absorption methods, this can be a relevant aspect for energy consumption, because regeneration of chemical absorbents can be energy intensive. Savings in regeneration energy can produce significant benefits for the overall process.

Embodiments of Alkaline Absorption Combinations

According to an exemplary embodiment, the $CaCO_3$ precipitation as alkaline wash can be applied in a plant, which is connected to a pulp and/or paper mill. The $CaCO_3$ formed in the alkaline wash can be regenerated back to CaO in the lime kiln of the mill exploiting existing facilities. For example, no need for new storages arises, because $CaCO_3$ can be a common ingredient in paper and board mills.

As an exemplary embodiment, after the first absorption step, the amine wash can optionally be followed by another amine wash, carbonate precipitation or carbonate wash. For example, amine wash can be combined with carbonate precipitation, wherein the alkaline cation can be selected to form a precipitate which is poorly soluble in water. The precipitate, for example, $CaCO_3$ can be used in papermaking. Alternatively, the amine wash can be boosted by a carbonate wash, wherein the cation is selected so that no precipitate is formed. Yet another option is to combine the first absorption step with second absorption, comprising amine wash followed by carbonate wash which can be further intensified by carbonate precipitation.

Regeneration of the Absorbent

As an exemplary embodiment, the method can further comprise regeneration of first or second absorbent solution or optionally both.

Depending on the absorbent and the level of purity desired, three procedures for regeneration can be employed. A simple and cost-effective method for regeneration can be the flash regeneration, wherein the absorbent pressure is decreased, for example, gradually. The acid gas concentration can be determined by the last step, the pressure of which can be slightly higher than ambient pressure. By employing vacuum in the last step, the acid gas concentration in the absorbent can further be lowered.

When higher purity is desired, the regeneration can be performed by stripping the absorbent with an inert gas. In stripping, the absorbent pressure can be lowered and thereafter the partial pressures of the gases to be removed can be decreased by feeding inert gas to the reactor. A negative side of this regeneration system is the dilution of the acid gas flow with inert gas used.

Both regeneration methods, flash and stripping, can still leave some acid gas to the absorption solvent. For cases where the level of hydrogen sulfide to be removed is very low, these methods can be sufficient. However, for high hydrogen sulfide concentrations regeneration based on solvent boiling, for example, hot regeneration can be desirable. This can provide a very high degree of purity for the gas to be washed and additionally high acid gas concentration in the effluent gases. An exemplary principle underlying this exemplary method is that gas solubility into the absorbent solvent can be reduced by rising the temperature. The solvent can be heated to its boiling point, whereby the vaporized solvent strips off the impurities. When the vapor is thereafter cooled down and condensed, it can be reused in the absorption. Hot regeneration can employ expensive heat exchangers and can consume heat for vaporization of the solvent, which can make it the most expensive of the methods mentioned. However, hot regeneration can be desirable for chemical absorbents as the acid gases are chemically bonded thereto.

In an exemplary embodiment, the regenerated absorption solution can be conditioned and returned to the absorption process.

Recovery of Metal Sulfides

Furthermore, from the aqueous solution or slurry, the metal sulfides, which can have poor solubility to the aqueous media, can be removed by any solid liquid separation process. Separation of solids can be simple and any suitable separation technique, such as filtration, settling or hydrocyclones, can be employed. Such a separation can be attractive in comparison to comparative methods, wherein the regeneration of the $H_2S$ containing absorbent can be conducted in a regeneration section. From said comparative regeneration section the sour gases separated from absorbent can be led to a sulfur plant converting $H_2S$ into elemental sulfur (S). For example, such investments can be mitigated or totally avoided.

Metal sulfide precipitate can be further treated to separate the metal and sulfur derivative and both consequently recovered. For example, when metal sulfide is CuS, separated solids can be utilized as raw material in copper industry, either for preparation of metallic copper or other copper compounds, and sulfur recovered from that process can be used as raw material for sulfuric acid production, for example, integrated to the site.

Use of the Purified Gas

After an exemplary treatment, purified gas can be obtained. The level of $H_2S$ in the gas recovered from step e can be less than 20 ppb, for example, less than 10 ppb, for example, less than 1 ppb. The purified gas can have several uses. It can be used for producing hydrogen, methanol, ethanol, dimethyl ether or aldehydes optionally by hydroformulation or directly used in engines for producing, for example, electricity. Also synthetic natural gas (SNG) can be produced from syngas.

According to an exemplary embodiment, the purified gas can also be used for producing a hydrocarbon composition containing $C_4$-$C_{90}$ hydrocarbons, optionally after further purification. For example, the hydrocarbon composition can be produced by a Fischer-Tropsch (FT) process.

As an exemplary embodiment of an overall process, the acid gas removal can be applied in a process for hydrocarbons or derivatives thereof production from biomass raw material. The method can comprise the following:

i) gasifying the biomass raw material in the presence of oxygen and/or steam to produce a gas comprising carbon monoxide, carbon dioxide, hydrogen, water and hydrocarbons;

ii) optionally a tar reforming step;

iii) optionally removing tar components, for example, naphthalene from the gas;

iv) optionally adjusting the hydrogen to carbon monoxide ratio;

v) wash according an exemplary embodiment;

vi) converting in a synthesis reactor at least a significant part of the carbon monoxide and hydrogen contained in the gas into a product selected from hydrocarbon composition and derivatives thereof; and vii) recovering the hydrocarbon or derivative thereof as the product.

According to an exemplary embodiment, steps can be conducted in the order from i to vii, for example, with or without optional steps. The wash according to an exemplary embodiment in step v can, for example, include:

a. contacting said gas with a first absorbent solution comprising transition metal ions, said transition metals selected from copper, zinc, iron and cobalt and mixtures thereof, in acidic aqueous solution;

b. binding hydrogen sulfide to said first absorbent solution;

c. recovering the gas from step b;

d. contacting recovered gas from step c with a second absorbent solution comprising an alkaline absorbent;

e. binding carbon dioxide to said second absorbent solution;

f. recovering the washed gas from step e.

The removal of $H_2S$ can be desirable to protect the synthesis catalysts. Furthermore, when applying this method for hydrocarbon production using FT synthesis, even though $CO_2$ can act as an inert in the synthesis, it can affect the synthesis selectivity guiding towards $C_{5+}$ products, whereby at least partial removal of $CO_2$ can be rendered desirable for the overall process. Contrarily to comparative processes for coal derived syngas purification, the attention in acid gas removal, when applied for biomass originated gas, can for example be directed to $CO_2$ removal.

In an exemplary embodiment, a high pressure can advance both absorption and the subsequent FT synthesis. If the pressure is increased before the absorption or at least before the second wash of an exemplary method, there is no need to alter the pressure after washes. Increasing the pressure in absorption above the level desired for FT synthesis is not necessary, but may be employed. For example, the pressure employed in FT-synthesis can be from 20 to 60 bar, for example, from 20 to 30 bar, which can set the upper limit to the absorption process.

In an exemplary embodiment, use of iron and cobalt as metal ions in the first absorbent solution can be advantageous, because they can be used in other parts of the overall process, for example, as FT synthesis catalysts. Copper is an exemplary metal ion, for example, as $CuSO_4$.

Optionally, the process can comprise a tar reforming step, for example, according to patent application FI 20105201. It discloses a method for purifying the gasification gas from tar-like impurities and ammonia by using catalysts at high temperatures. The pre-catalyst zone comprises a zirconium/noble metal catalyst layers followed by the actual reformer catalyst zone comprising a nickel or another reforming catalyst layer(s). Oxygen or another oxidizer, and optionally steam, can be led to the reforming zone to increase the temperature.

For FT catalytic synthesis, the hydrogen to carbon monoxide molar ratio can be from 1.7 to 2.2, for example, about 2. The ratio can be adjusted in any suitable manner. Said ratio can be adjusted by a water gas shift (WGS) reaction either as sour gas shift or after appropriate gas sweetening. Another exemplary approach is to add hydrogen obtained from elsewhere in the process or from another process to adjust said ratio.

For example, to some extent, COS may be hydrolyzed in the absorption of an exemplary embodiment. Sometimes, a separate hydrolysis can be desirable. According to an exemplary method for hydrocarbon production, step v can be preceded by a COS hydrolysis step. Said hydrolysis can produce $H_2S$, which can be consequently removed in the first absorption step and $CO_2$ removed in the second absorption step of the wash process. This can be beneficial in cases where the synthesis gas contains distracting amounts of COS. COS can have poor solubility to chemical absorbents, for example, causing difficulties in purification.

In addition, according to an exemplary embodiment, it can also be beneficial to operate a water scrubber before the wash steps to minimize $NH_3$ and HCl in transition metal precipitation stage. Said $NH_3$ and HCl interfere metal precipitation stage and their removal can contribute to purer CuS precipitate.

The following non-limiting examples were conducted to evidence exemplary concepts.

EXAMPLES

The exemplary method employed is a two-stage washing process.

The first phase, absorption using an aqueous solution comprising transition metal ions, was described in the applicant's earlier patent application EP 11153704. Examples 1 and 2 of EP 11153704 apply for the first phase in the present exemplary method. In said first phase, the gas to be purified is contacted with a first absorbent solution comprising transition metal ions, said transition metals selected from copper, zinc, iron and cobalt and mixtures thereof, in acidic aqueous solution (in the experiments aqueous $CuSO_4$ solution); hydrogen sulfide is bound to said first absorbent solution and gas recovered.

The combination of first and second absorption phases is studied as a simulation. Said simulation provides data on the stream compositions and process parameters. Simulation settings and results thus obtained are given as example 3.

Example 1

Semibatch Absorption Tests of $H_2S$ Removal, Using Aqueous Copper Sulfate ($CuSO_4$) as a Model Absorbent of the First Absorbent Solution Materials and Methods The absorption experiments were carried out using a micro reactor equipment for WGS reaction. Semibatch absorption tests of $H_2S$ removal, using aqueous copper sulfate ($CuSO_4$)-solution as absorbent, were carried out in a simple 0.5 liter gas-wash bottle with magnetic stirring, placed in the product line of a micro reactor before the online mass spectrometer.

Absorption tests were carried out at room temperature and atmospheric pressure. Total gas feed flow was 12 $dm^3$/h to the WGS reactor. The basic gas feed composition is shown in Table 1.

TABLE 1

Basic feed composition.

| | Total flow | | | | | |
|---|---|---|---|---|---|---|
| liter(NTP)/h | $H_2O$ vol-% | CO vol-% | $CO_2$ vol-% | $H_2$ vol-% | $N_2$ vol-% | $CH_4$ vol-% |
| 12.0 | 36 | 12 | 22 | 24 | 5 | 1 |

The impurity components were purchased from AGA as dilute hydrogen mixture gases $H_2S/H_2$, $COS/H_2$ and $NH_3/H_2$. In the feed, $H_2S$ concentration was 500 ppm (vol) in all experiments. In some tests also 85 ppm COS and 800 ppm $NH_3$ were used in the feed. However, nearly all COS was hydrolyzed already before the absorption bottle as it was not possible to bypass the catalytic reactor, where COS hydrolysis took place as a side reaction of water gas shift reaction.

The product gas was analyzed online using a mass spectrometer (GC-MS but GC separation not in use). The quantitation limit is dependent on the component, and in these MS measurements quantitation limit was about 1 ppm.

In absorption experiments carried out in laboratory in bubbled gas wash bottle described above the following test program was carried out as follows:

The $CuSO_4$ concentration varied in different experiments from dilute 50 ppm up to 500 ppm. The mass transfer in the bubbled gas wash bottle was enhanced by agitation.

Absorption rate of $H_2S$ in $CuSO_4$-water solution was measured at different $CuSO_4$ concentrations.

Identification/quantification of crystallized Cu-solid components and particle size distribution of crystallized particles.

Results

The feed rates of different impurity components in synthesis gas entering WGS reactor in the experiments were:

Test 1—$CuSO_4$ conc. 0.01 wt-%, $H_2S$ concentration in feed gas 500 $ppm_v$

Figure 2:
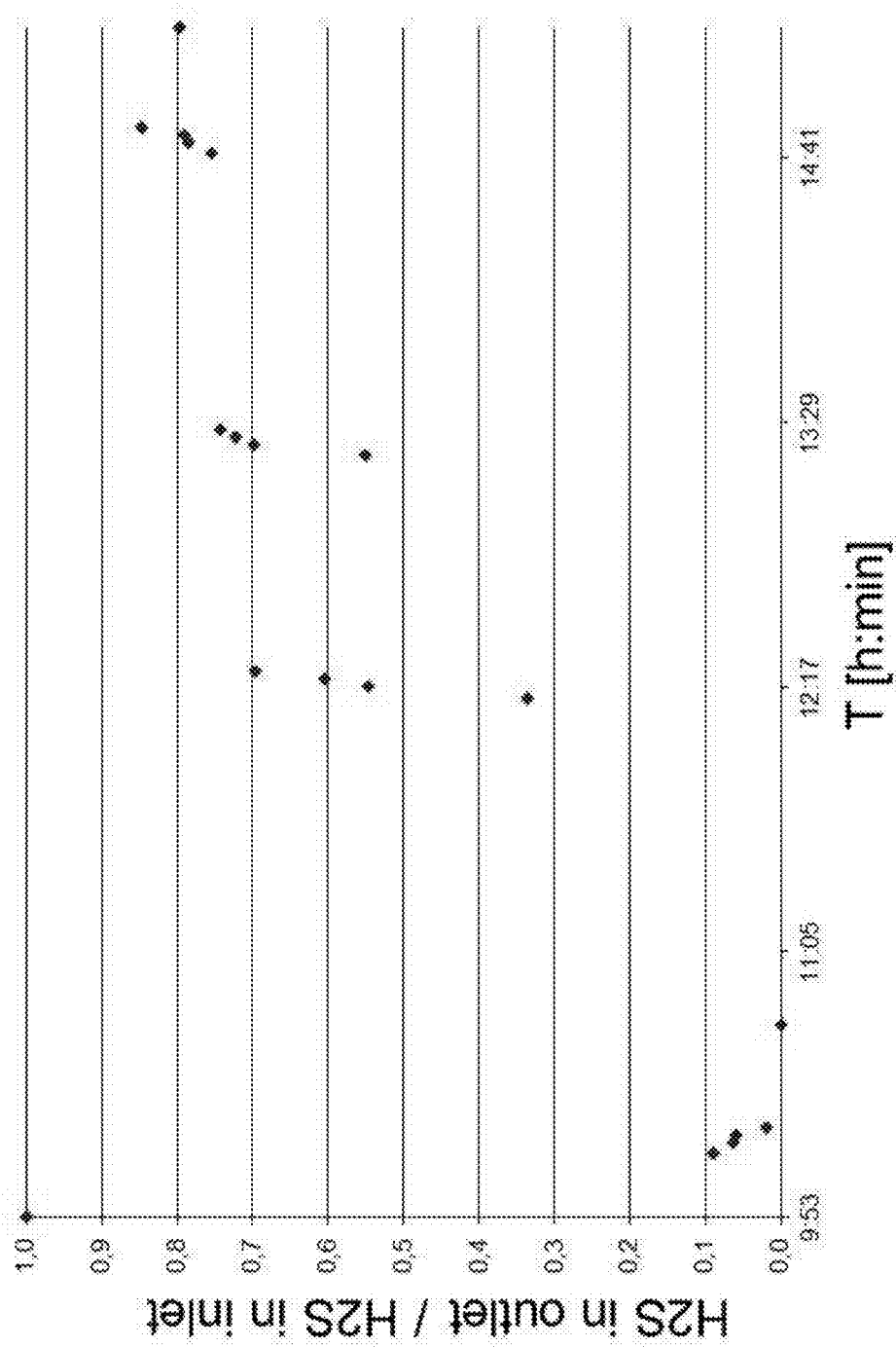
FIG. 2 is a graph showing a ratio of $H_2S$ mole flow in the wash bottle outlet/$H_2S$ mole flow in the wash bottle inlet as a function of time [h:min], according to an exemplary aspect. Such data is of the experiment of Example 2. The experiment was started at 9:53 and the last point was measured at 15:16.
Figure 3:
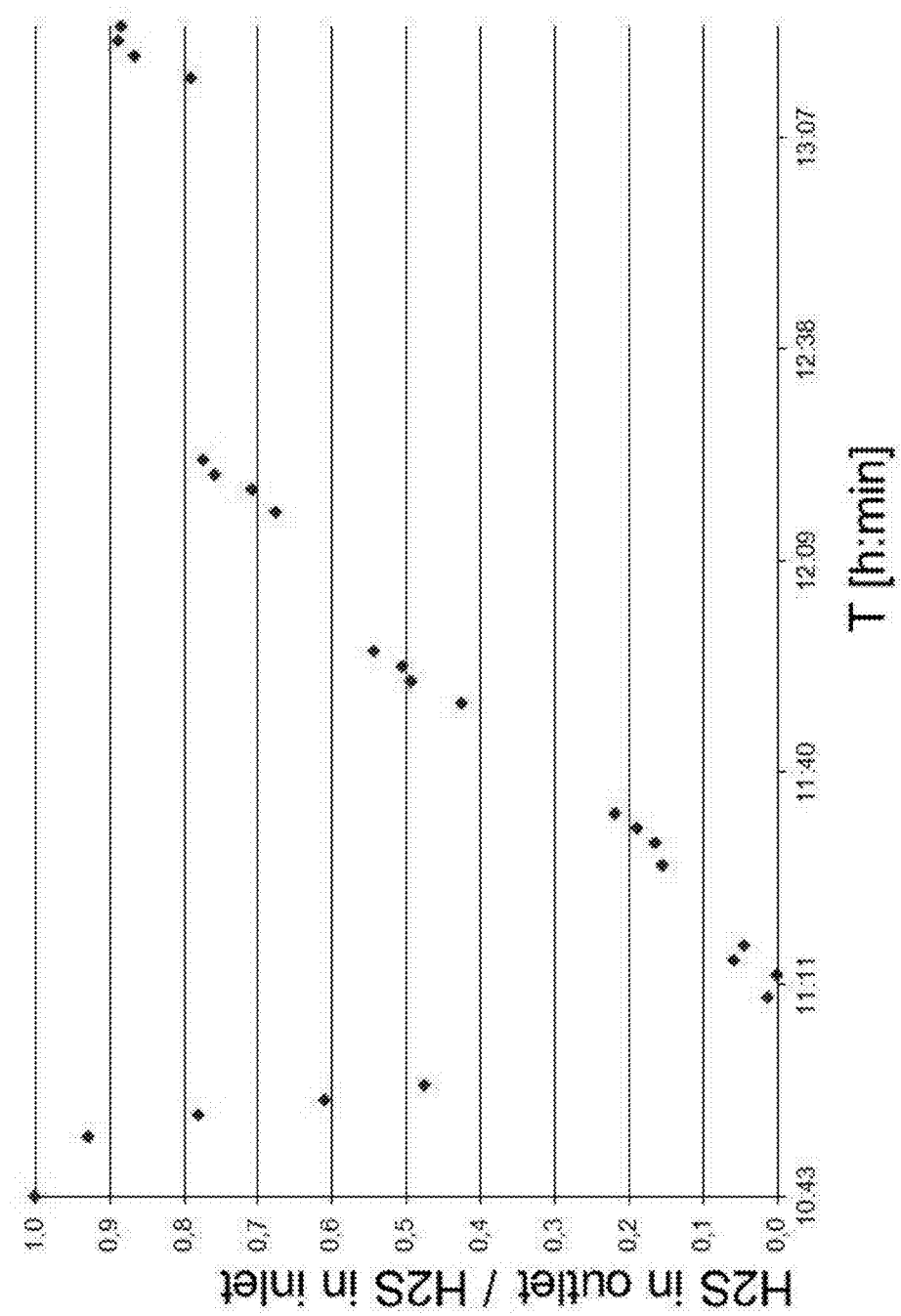
FIG. 3 is a graph showing a ratio of $H_2S$ mole flow in the wash bottle outlet/$H_2S$ mole flow in the wash bottle inlet as a function of time [h:min], according to an exemplary aspect. Such data is of the experiment of Example 3. The experiment was started at 10:43 and the last point was measured at 13:22.

Test 2—$CuSO_4$ conc. 0.01 wt-%, $H_2S$ concentration in feed gas 500 $ppm_v$, $NH_3$ 800 $ppm_v$, COS 85 $ppm_v$ Test 3—$CuSO_4$ conc. 0.0051 wt-%, $H_2S$ concentration in feed gas 500 $ppm_v$, $NH_3$ 800 $ppm_v$, COS 85 $ppm_v$ $H_2S$ mole flow in wash bottle outlet/$H_2S$ mole flow in wash bottle inlet in different experiments are shown as a function of time in FIGS. 1-3.

Conclusions $CuSO_4$ was capable of removing 500 ppm $H_2S$ (mol-frac) completely from feed gas both with 0.01 and 0.005 wt-% aqueous solutions. The product is solid CuS deposit.

Too high pH resulted in deposition of, for example, metal hydroxides or carbonates in which case no or less hydrogen sulfide was removed. Carbonate formation was also dependent on $CO_2$ partial pressure.

Too low pH resulted in no deposit formation in which case no hydrogen sulfide was removed (results not shown).

$NH_3$ in the feed did not influence $H_2S$ removal by copper sulfate.

With regard to the results described in FIGS. 1-3, the experimental setup was the following: the bottle of aqueous copper sulphate wash solution was placed after two reactor product coolers but before drum type volumetric gas flow meter. By opening the valves the gas could be made to flow through the $CuSO_4$ aqueous solution and after that to the GC-MS, and subsequently the gas was conducted to the drum type volumetric gas flow meter for venting. The first point shown graphically is from the point of time immediately before the gas was conducted to the $CuSO_4$ bottle. At that point of time, precipitation of CuS is not detectable yet. Then, a series of 4 samples was taken within 7 minutes, and after a short break, a new series of 4 samples was taken within 7 minutes, etc.

The points in the figures in which the $H_2S$ concentration is 0 indicate points where all $H_2S$ is removed from the gas. Suddenly after that all the copper is depleted and the $H_2S$ concentration increases again.

Some of the tests have contained COS in the feed. Having passed the shift reactor it has in practice been completely hydrolyzed since the feed also contains water:

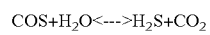

$COS+H_2O \longleftrightarrow H_2S+CO_2$

Then, there is more $H_2S$ in the feed of the $CuSO_4$ washing than the amount of $H_2S$ fed into the system. This effect could be seen in the analysis in the amount of effluent COS 0-3 $ppm_v$.

Example 2

Absorption Test for $H_2S$ Removal from Syngas in Packed Bed Absorption Column

Absorption tests for $H_2S$ removal from syngas in packed bed absorption column were carried out in a pilot scale test unit. The absorber performance was tested in a syngas preparation plant in Varkaus, Finland.

Absorber details and data sheets are shown below:

Absorber:
packed bed absorber, packing metal, 2-in or 50 mm, surface area 100 $m^2/m^3$
height: 9 m, diameter 0.1 m Feed Gas:
feed rate: 50-60 kg/h
pressure 30 bar, temperature 25° C.
Composition/mol-%: CO 21, $CO_2$ 30, $H_2$ 31, $CH_4$ 3, $N_2$ 15, $H_2S$ 140 ppm, naphthalene 100 ppm, benzene 1200 ppm and traces $NH_3$ and COS Absorbent Feed:
$CuSO_4$-water, concentration 0.15 wt-%
Feed rate was varied, equivalent $Cu^{2+}$ molar feed ratio to $H_2S$ 1.5-6

The mol-% of $H_2S$ in effluent gas was measured by on-line hydrogen sulphide gas analyser. The measured $H_2S$ mole fraction in effluent syngas was at minimum 70 ppb at equivalent $Cu^{2+}$ molar feed ratio to $H_2S$ value of 6.

As a result, the correlation between product gas S concentration and stoichiometric Cu/S ratio in the feed was determined. For stoichiometric ratios from 1 to 5 almost linear correlation was observed, wherein the stoichiometric ratio of 1.5 for Cu/S led to less than 3 ppm$_v$ H$_2$S and ratio 5 led to 90 ppb$_v$ H$_2$S in the product gas.

Example 3

A Simulation of the Method for Washing Hydrogen Sulfide and Carbon Dioxide According to an Exemplary Aspect Combining a CuSO$_4$ Wash and an Amine Wash In this example a two-stage wash according to an exemplary embodiment was simulated. The first step with aqueous CuSO$_4$ as absorption solution was simulated with Aspen Plus flow sheeting program with the following process parameters:

The absorber models are rate-based models realized in Radfrac

The physical property and VLE method of ELECNRTL

All reactions, except for Cu-reaction, Henry-components, parameters, etc. are set as Aspen Plus defaults and realized through the Electrolyte wizard.

The second wash step, contacting recovered gas from step c with a second absorbent solution comprising an alkaline absorbent was simulated with ProTreat simulator. This simulator can be especially suitable for amine wash simulations.

The results from the simulations are given in two tables. First, table 2 discloses hourly flows of the main components as moles. It gives calculated compositions for feed and treated gas. From the same simulation data, the operating conditions were calculated as well. The second table (table 3) gives calculated energy consumption values exhibiting the good energy economy of an exemplary method in comparison to methanol wash.

TABLE 2

Two stage wash according to an exemplary embodiment.

| Mole flow [kmol/h] | Syngas in | Syngas out |
|---|---|---|
| H$_2$S | 1.05 | 2.21 × 10$^{-4}$ |
| CO$_2$ | 3340 | 241.5 |
| CO | 2876 | 2873 |
| H$_2$ | 5753 | 5745 |

From these results, it can be concluded that said combination of aqueous CuSO$_4$ wash and amine wash removes H$_2$S and CO$_2$ effectively.

TABLE 3

Energy consumption as steam and electricity used for the absorption steps.

| Wash | LP stream (MW) | Electricity (MW) |
|---|---|---|
| MeOH | 46 | 26 |
| CuSO$_4$ + Amine | 30 | 7 |

These results confirm the effect of an exemplary method for both the steam and electricity consumption. It verifies the energy efficiency of the removal of sulfur components and carbon dioxide from the syngas.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for washing hydrogen sulfide and carbon dioxide from a gas obtainable by gasification of a carbonaceous biomass, the method comprising:
   a) contacting the gas with a first absorbent solution comprising transition metal ions in acidic aqueous solution, wherein the transition metal ions include copper, zinc, iron, cobalt or a mixture thereof;
   b) binding hydrogen sulfide present in the gas to said first absorbent solution;
   c) recovering the gas from step b);
   d) contacting the recovered gas from step c) with a second absorbent solution comprising an alkaline absorbent;
   e) binding carbon dioxide present in the recovered gas from step c) to said second absorbent solution; and
   f) recovering the gas obtained from step e).

2. The method according to claim 1, wherein the concentration of the transition metal ions in the first absorbent solution is less than about 1000 ppm$_w$, calculated from a weight of the first absorbent solution.

3. The method according to claim 1, wherein the transition metal ions comprise copper.

4. The method according to claim 1, wherein the contacting of the gas with the first absorbent solution takes place at a temperature from 10 to 80° C. and at a pressure from 1 to 50 bar.

5. The method according to claim 1, wherein the contacting of the gas with the second absorbent solution takes place at a temperature from 10 to 80° C.

6. The method according to claim 1, wherein the contacting of the gas with the second absorbent solution takes place at substantially the same temperature and/or substantially the same pressure as the contacting of the gas with the first absorbent solution.

7. The method according to claim 1, wherein an H$_2$S level of the gas recovered from step f) is less than 20 ppb.

8. The method according to claim 1, wherein said first and/or second absorbent solution is/are regenerated after gas recovery.

9. A method for producing hydrocarbons or derivatives thereof from a biomass raw material, the method comprising:
   i) gasifying the biomass raw material in the presence of oxygen to produce a gas comprising carbon monoxide, carbon dioxide, hydrogen, water and hydrocarbons;
   ii) optionally conducting a tar reforming step;
   iii) optionally removing tar components from the gas;
   iv) optionally adjusting a hydrogen-to-carbon monoxide ratio;
   v) washing hydrogen sulfide and carbon dioxide from the gas comprising carbon monoxide, carbon dioxide, hydrogen, water and hydrocarbons by conducting the method according to claim 1;
   vi) converting in a synthesis reactor at least a part of the carbon monoxide and hydrogen contained in the gas into a product including a hydrocarbon composition or derivatives thereof; and
   vii) recovering the hydrocarbon composition or derivatives thereof.

10. The method according to claim 9, further comprising conducting COS hydrolysis prior to step v).

11. The method according to claim 1, wherein the alkaline absorbent includes an amine, carbonate, aqueous CaO solution or a combination thereof.

12. The method according to claim 1, wherein the second absorbent solution is applied as an aqueous amine wash, carbonate wash, carbonate precipitation or a combination thereof.

13. The method according to claim 1, wherein the concentration of the transition metal ions in the first absorbent solution is less than about 100 $ppm_w$, calculated from a weight of the first absorbent solution.

14. The method according to claim 1, wherein the transition metal ions comprise copper from $CuSO_4$.

15. The method according to claim 1, wherein the contacting of the gas with the second absorbent solution takes place at a temperature from 20 to 40° C.

16. The method according to claim 1, wherein an H2S level of the gas recovered from step f) is less than 1 ppb.

17. The method according to claim 9, wherein the transition metal ions comprise copper.

18. The method according to claim 4, wherein the contacting of the gas with the second absorbent solution takes place at substantially the same temperature and/or the same pressure as the contacting of the gas with the first absorbent solution.

19. The method according to claim 5, wherein the contacting of the gas with the second absorbent solution takes place at substantially the same temperature and/or the same pressure as the contacting of the gas with the first absorbent solution.

20. The method according to claim 3, wherein the alkaline absorbent includes an amine, carbonate, aqueous CaO solution or a combination thereof.

21. The method according to claim 1, wherein the first absorbent solution has a pH of about 1 to 6.5.

22. The method according to claim 1, wherein the first absorbent solution has a pH of about 1 to 5.

23. The method according to claim 1, wherein the first absorbent solution consists essentially of transition metal ions in acidic aqueous solution.

24. The method according to claim 1, wherein the first absorbent solution consists of water and $CuSO_4$.

\* \* \* \* \*